United States Patent [19]
Belknap et al.

[11] Patent Number: 5,924,355
[45] Date of Patent: Jul. 20, 1999

[54] HOUSEHOLD ELECTRIC TOASTER

[75] Inventors: Lee J. Belknap, Glen Allen, Va.; John W. Foster, Mount Airy, N.C.

[73] Assignee: Hamilton Beach/Proctor-Silex, Inc., Glen Allen, Va.

[21] Appl. No.: 08/944,150

[22] Filed: Oct. 6, 1997

[51] Int. Cl.[6] ........................................ A47J 37/08
[52] U.S. Cl. .................... 99/389; 99/329 RT; 99/385; 99/391; 219/521
[58] Field of Search ................ 99/329 R, 331–333, 99/326–328, 329 P, 329 RT, 334, 335, 337, 339, 340, 385, 389–391, 393, 399, 400, 401, 402; 219/521, 537, 386, 413; 426/523

[56] References Cited

U.S. PATENT DOCUMENTS

| | | | |
|---|---|---|---|
| 2,590,328 | 3/1952 | Koci | 99/389 |
| 2,605,832 | 8/1952 | Mueller . | |
| 2,611,849 | 9/1952 | Gough . | |
| 2,750,876 | 6/1956 | Visos . | |
| 3,169,469 | 2/1965 | Parr . | |
| 4,136,607 | 1/1979 | Mitsuo et al. . | |
| 4,216,372 | 8/1980 | Huggler | 219/521 |
| 4,345,513 | 8/1982 | Holt . | |
| 4,396,825 | 8/1983 | Cox et al. . | |
| 4,718,332 | 1/1988 | Muthrath . | |
| 5,095,814 | 3/1992 | Ott et al. . | |
| 5,265,521 | 11/1993 | Belknap . | |
| 5,385,082 | 1/1995 | Huggler et al. . | |
| 5,528,980 | 6/1996 | McClean | 99/389 |
| 5,642,657 | 7/1997 | Yeung et al. . | |
| 5,664,481 | 9/1997 | Huggler | 99/328 |
| 5,802,957 | 9/1998 | Wanat et al. | 99/327 |

FOREIGN PATENT DOCUMENTS

WO 97/09916   3/1997   WIPO .

OTHER PUBLICATIONS

5 Photographs dated Aug. 10, 1998 of the bread lifter device from a Toastmaster Model B722 admitted to be prior art, date unknown.

*Primary Examiner*—Timothy F. Simone
*Attorney, Agent, or Firm*—Roger S. Dybvig

[57] ABSTRACT

A low cost toaster having a metal body and plastic end panels. The end panels have cooling inlet vents near their lower ends and the top wall of the metal body has air outlet vents. Ambient air admitted through the inlet vents flows upwardly through the toaster and outwardly through the outlet vents to provide a cooling effect sufficient to allow the use of inexpensive plastic material for molding the end panels. The toaster has a bread lifter made entirely from a wire rod, a bread lifter extension made entirely from a wire rod, and a toast color cam made entirely from a single piece of sheet metal.

3 Claims, 6 Drawing Sheets

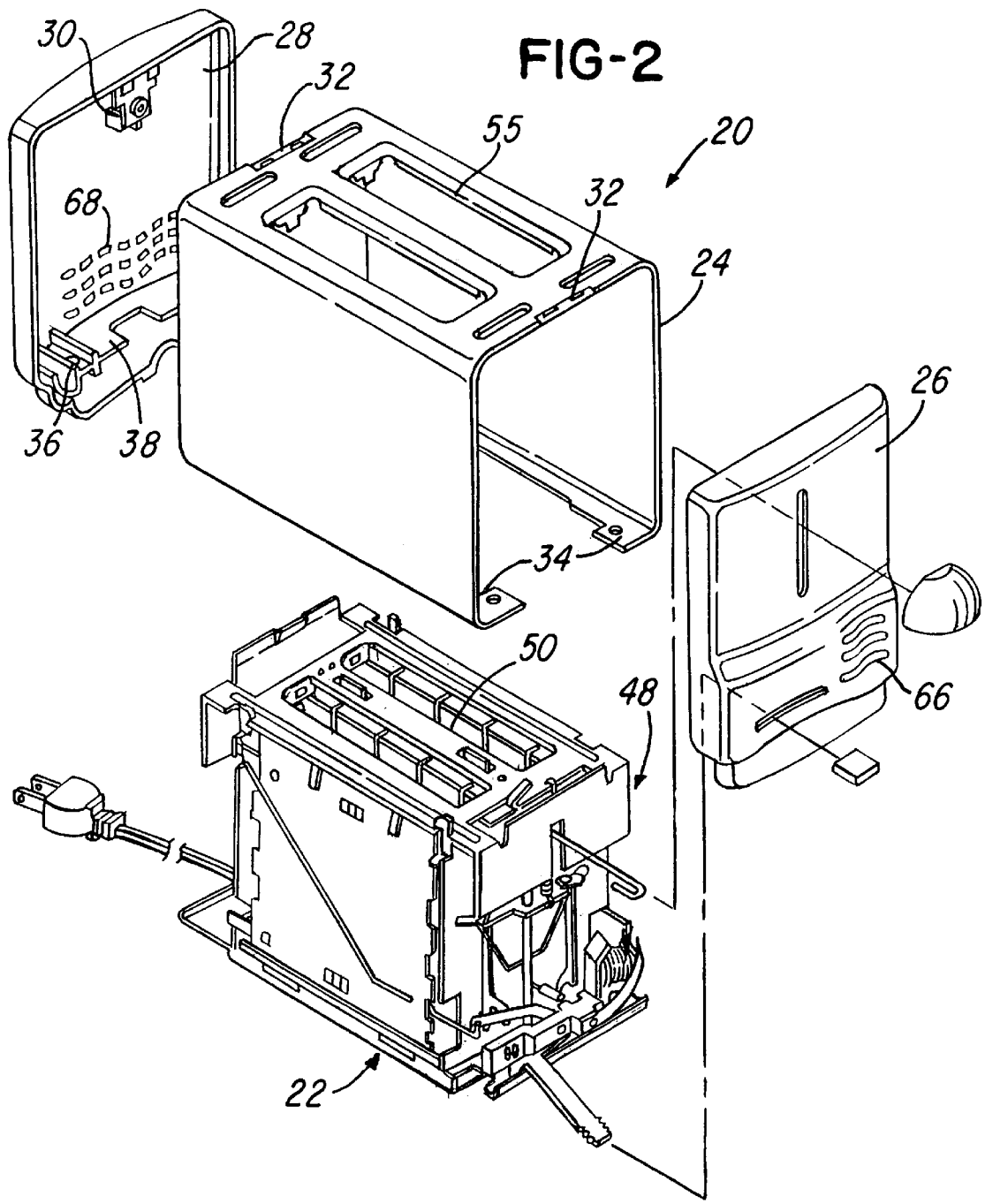

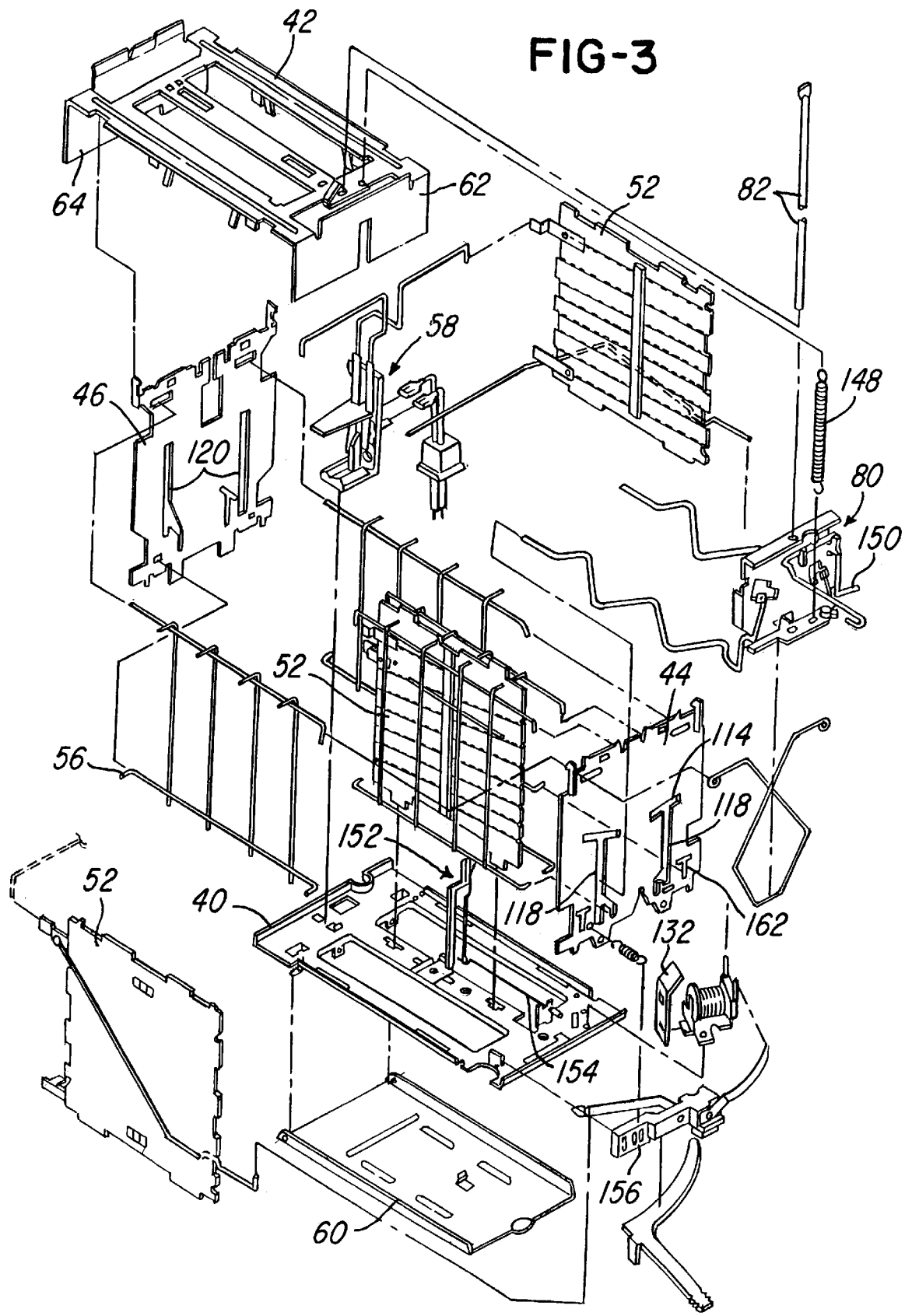

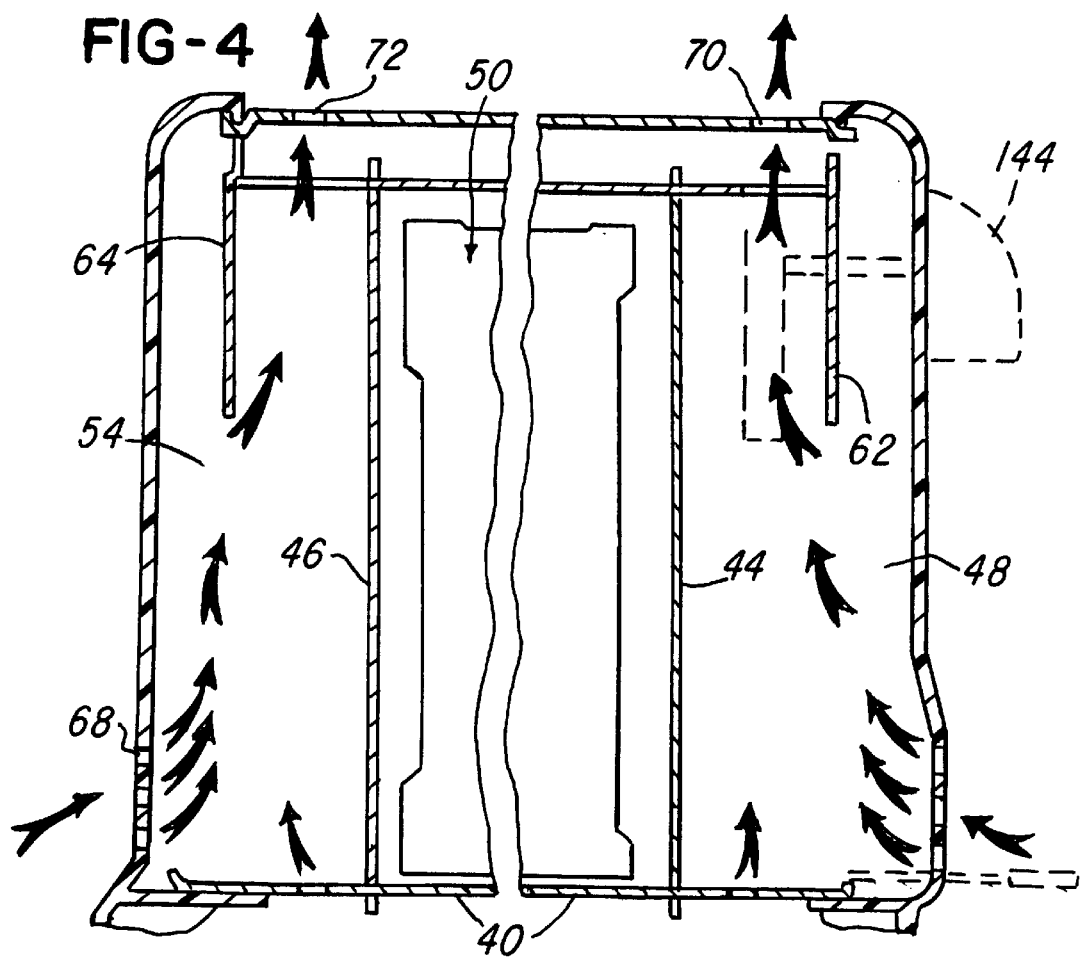
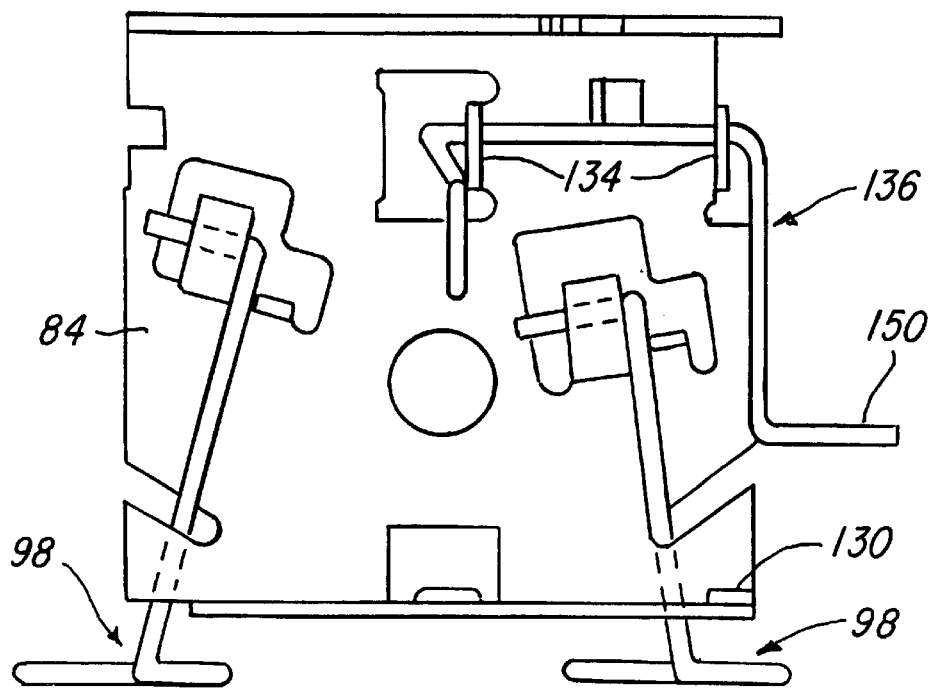

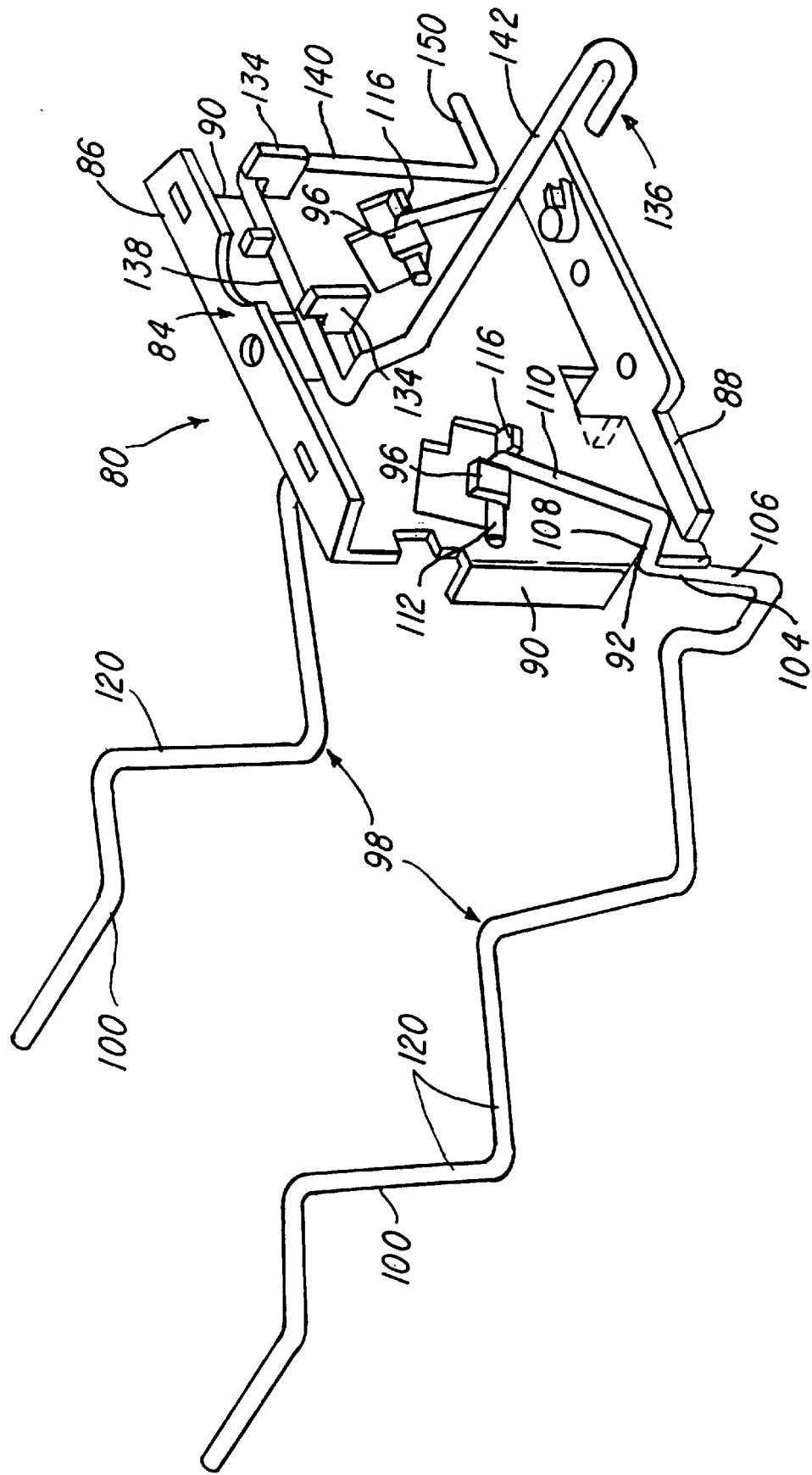

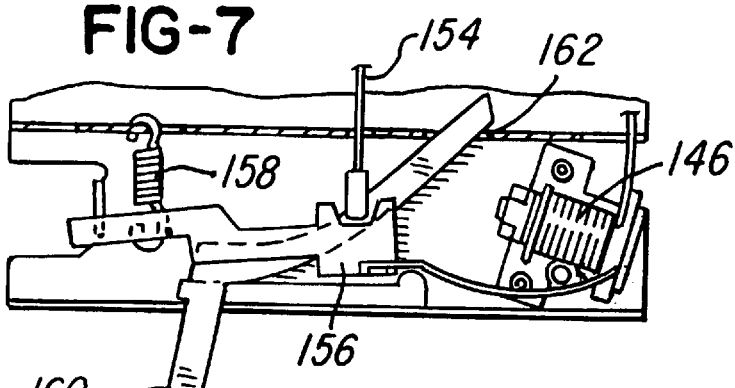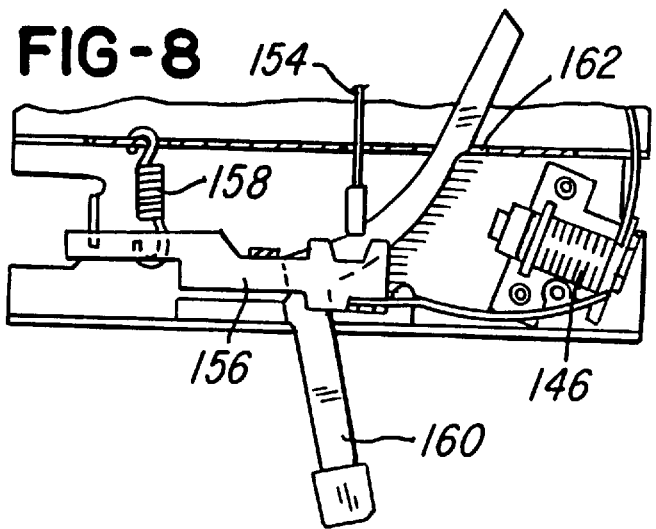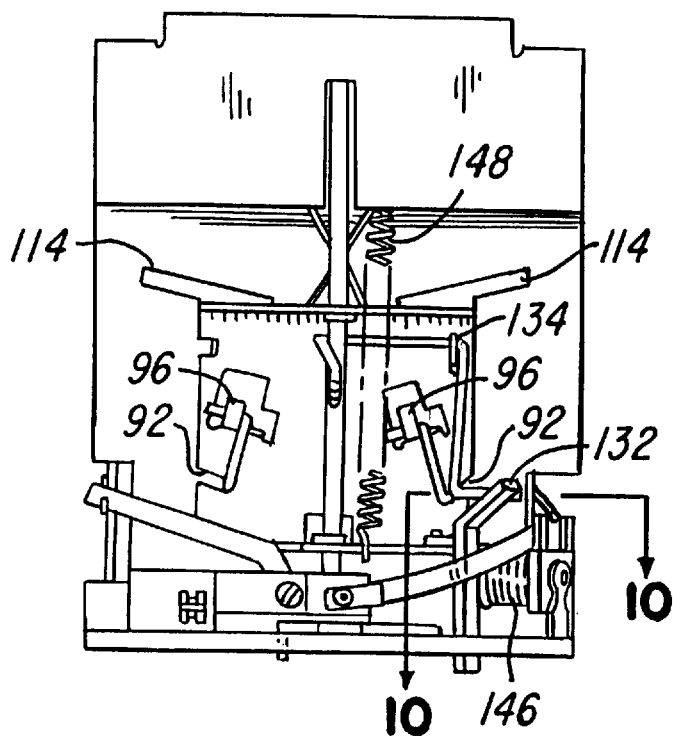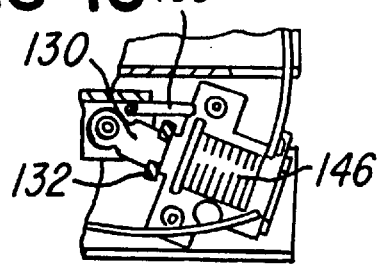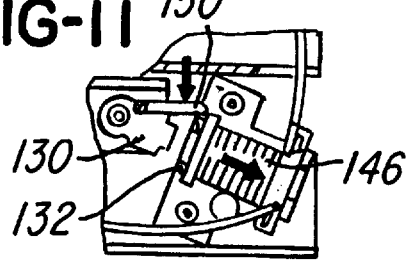

HOUSEHOLD ELECTRIC TOASTER

FIELD OF THE INVENTION

This invention relates to a household electric toaster but aspects of this invention can be used in other heating appliances, particularly toasters for commercial use.

BACKGROUND OF THE INVENTION

Household toasters commonly have a control chamber separated by a vertical front frame plate from a toasting chamber. A bread carriage plate, termed a "bread lifter plate" herein, is slidably received on a support post in the control chamber and carries a pair of bread supports, termed "bread lifters" herein, that extend into and at least partially through the toasting chamber between heating elements therein. The lifter plate and accordingly the bread lifters are vertically-movable between a lowered position for holding bread or other food items in position to be toasted and a raised position for permitting the bread or other food items to be placed on or removed from the bread lifters.

Some toasters have only one bread lifter and some have more than two bread lifters. For ease of discussion, this invention is disclosed for use in a toaster configuration which has two bread lifters, such presently being the most common configuration. However, as will become apparent, aspects of this invention described below can be used in other toaster configurations.

In many toasters, the bread supports are part of a vertically movable support carriage to which the bread supports are connected. Spring means biases the support carriage upwardly so that the bread supports are normally in their upper, non-toasting position. The support carriage can be lowered to the toasting position by manipulation of a control lever, termed a "lifter extension" herein, accessible from outside the housing. During a toasting cycle, a latch mechanism holds the support carriage with its bread supports in their lowered, toasting position. User-adjustable electric means controls the toasting cycle times during which the bread supports are latched in their lowered position in order to toast the food items to the desired toast color.

A latch comprising a pivotally mounted armature or latch plate biased away from the face of the solenoid coil hooks over an upwardly-facing surface on the bread carriage plate when the carriage plate is lowered to its toasting position. To terminate a toasting cycle, a solenoid switch is closed, causing the solenoid to be energized, whereupon the latch plate is pulled toward the solenoid coil and unhooked from the carriage plate. The bread lifter spring returns the bread lifter assembly to its raised position during which time the bread lifter that was holding the power switch closed moves upwardly away from the power switch and the power switch opens.

In order to energize the solenoid coil at the end of the toasting cycle, a bimetal heat sensing assembly in the toasting chamber drives a horizontally-movable switch operating shaft outwardly toward a movable switch contact located in the control chamber. The duration of the toasting cycle and, therefore, the resultant degree or "color" to which the toast is toasted, is adjusted by a toast color control cam that moves the switch contacts nearer to or farther from the end of the bimetal-driven switch operating shaft, so that the excursion of the shaft from the beginning of a toasting cycle to the end of a toasting cycle required to close the solenoid switch can be changed to obtain different toast colors.

Notwithstanding the several elements that comprise a household toaster, household toasters are usually remarkably inexpensive. The low cost partly results from the use of sophisticated manufacturing and assembling techniques. There is however, an ever-present need to reduce the costs of toasters in order to provide toasters to the public at low costs and meet the demands of a competitive industry.

SUMMARY OF THE INVENTION

An object of this invention is to provide an improved household electric toaster. More particularly, an object of this invention is to provide a rugged, high quality household toaster which can be manufactured at relatively low cost. To accomplish these objects, this invention utilizes improvements in the following areas of toaster construction and operation:

1. The toaster has a metal body and plastic end panels. The end panels have cooling inlet vents near their lower ends that admit ambient air into the ends of the toaster. The flowing air flows outwardly through air outlet vents in the top wall of the metal body. The cooling is sufficient to enable the use of an inexpensive plastic material, preferably polypropylene, for molding the end panels. In contrast, plastic end panels are normally made from plastic materials that have a greater heat rating.

2. Each bread lifter is made entirely from a wire rod and is connected to the lifter plate without the use of fasteners, welding or soldering and, for ease of assembly, in a manner that prevents rotation of the lifter about a vertical axis.

3. The bread lifter extension is made entirely from a wire rod.

4. A toast color cam is made entirely from a single piece of sheet metal and is supported by the front frame plate of the toaster.

Other objects and advantages of this invention will become apparent in view of the following description taken in conjunction with the accompanying drawings.

BRIEF DESCRIPTION OF THE DRAWINGS

FIG. 2 is an exploded, perspective view of parts of the toaster of FIG. 1.

FIG. 3 is an exploded perspective view of the frame and toaster mechanical operating parts shown assembled in FIG. 2.

FIG. 4 is a highly simplified, diagrammatic and cross-sectional view of the toaster of FIG. 1, and illustrates the path of ambient air flowing upwardly inside the ends of the toaster.

FIG. 5 is a perspective view of a bread lifter assembly shown also in FIGS. 1 and 2.

FIG. 6 is an elevational view of the bread lifter assembly of FIG. 5.

FIG. 7 is a fragmentary, plan view of a portion of the front of the toaster showing a toast color control assembly including a one-piece toast color control cam in accordance with this invention.

FIG. 8 is view similar to FIG. 7 but with the toast color control cam in a different position of adjustment.

FIG. 9 is a front elevational view of the control chamber of the toaster of FIG. 1.

FIG. 10 is fragmentary, partly cross-sectional and partly plan view taken on line 10—10 of FIG. 9 of a portion of the toast color control assembly illustrating a carriage plate hooked by a latch plate or armature.

FIG. 11 is a view similar to FIG. 10 but showing the latch plate moved away from the carriage plate by the lifter extension.

DETAILED DESCRIPTION

Figure 1:
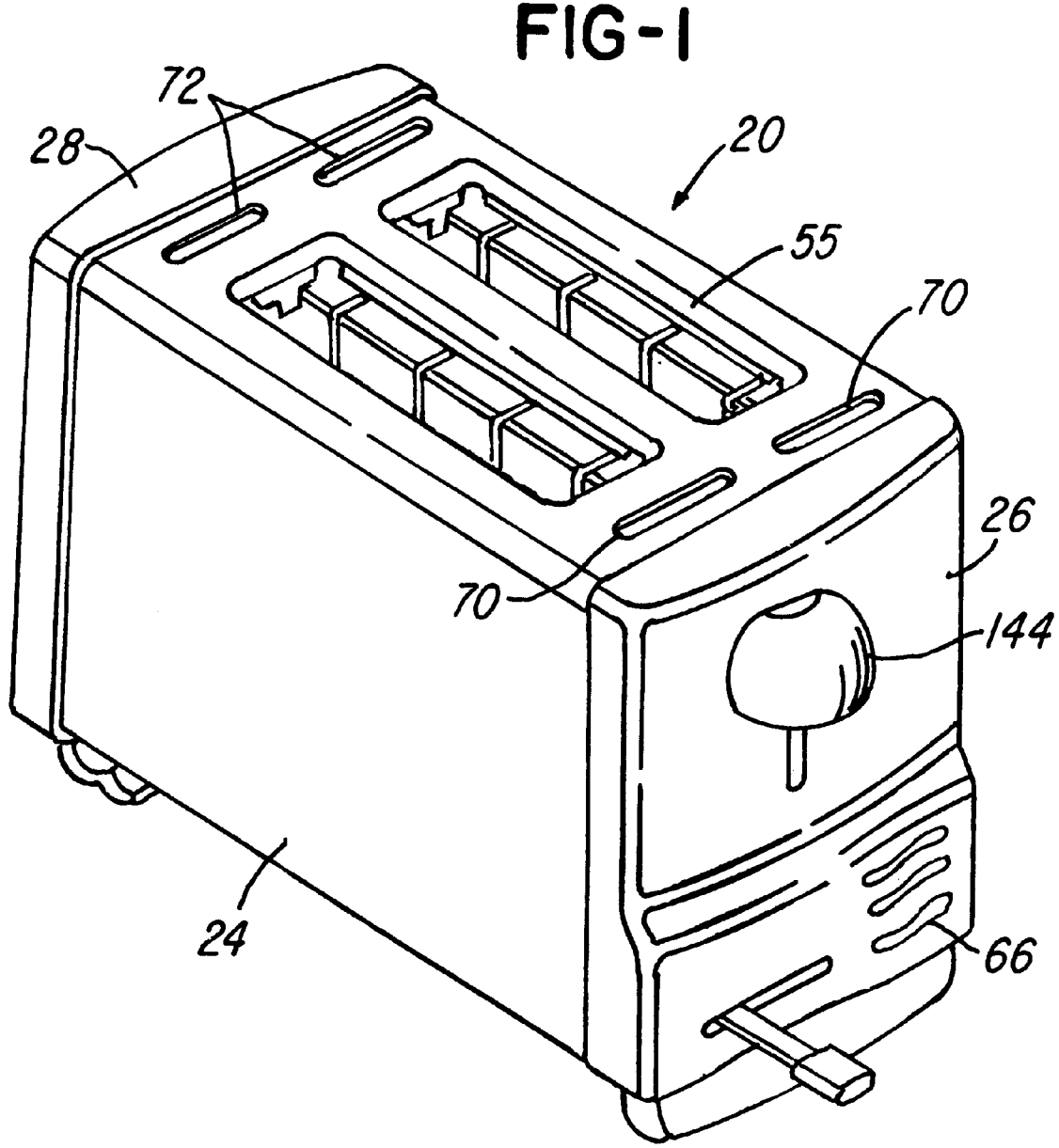
FIG. 1 is a fragmentary perspective view of a toaster in accordance with this invention.

With reference first to FIGS. 1 and 2, this invention is shown embodied in a household electric toaster 20 comprising a frame 22 and operating parts to be described below partly covered by a tubular metal body 24 having its opposite ends closed by plastic end panels, namely a front end panel 26 and a rear end panel 28. The end panels 26 and 28 are connected to the metal body 24 by means of metal clips 30 on the end panels 26 and 28 that extend into cooperating apertures 32 in the upper ends of the metal body 24. The end panels 26 and 28 are also connected to the metal body 24 by screws (not shown) that extend upwardly through screw-receiving apertures 34 in the bottom portions of the metal body 24 and into holes 36 in mounting flanges 38 adjacent the bottom edges of the end panels 26 and 28. (Only the holes 36 and the mounting flange 38 of the rear end panel 28 are illustrated in the drawings. These parts are essentially identical to the corresponding parts of the front end panel 26.)

With reference also to FIGS. 3 and 4, the toaster frame 22 includes a base frame plate 40, a top frame plate 42, a front frame plate 44 and a rear frame plate 46. The front frame plate 44 separates the toaster 20 into a control chamber 48 at its forward end and a toasting chamber 50. Toasting chamber 50 is heated by plural heating elements 52 that extend substantially the length thereof. The rear frame plate 46 separates the toasting chamber 50 from a rear chamber 54. Large openings 55 in the top wall of the metal body 24 open to the toasting chamber 50 enable bread or other food items to be toasted to be placed in and removed from the toasting chamber 50.

FIG. 3 also shows wire grills 56, a power switch assembly 58, and a crumb tray 60, all of which are conventional and form no part of the instant invention.

In order to use inexpensive plastic materials which do not have a high heat rating, a front heat shield 62 is located in the control chamber 48 and a rear heat shield 64 is located in the rear chamber 54. The heat shields 62 and 64 preferably are integrally formed with and depend from the top frame plate 42. Furthermore, the front end panel 26 has several inlet cooling vents 66 in the lower portion thereof that admit ambient air into the control chamber 48. Similarly, the rear end panel 28 has several cooling vents 68 in the lower portion thereof that admit ambient air into the rear control chamber 54. Ambient air will also enter the control chamber 48 and the rear chamber 54 through various openings in the base frame plate 40.

Referring to FIG. 4, the ambient air entering the control and rear chambers 48 and 54 flows upwardly therethrough and outwardly through two pairs of air outlet vents 70 and 72 in the top wall of the metal body 24 which overlie and open to, respectively, the control chamber 48 and the rear chamber 54. Provision of the heat shields 62 and 64 and the venting of ambient air through the control chamber 48 and the rear chamber 54, inexpensive plastic materials can be used to mold the end panels 26 and 28. End panels 26 and 28 made from polypropylene are presently preferred because polypropylene is relatively inexpensive and easy to use.

With reference to FIGS. 3, 5, 6 and 9, a bread lifter assembly, generally designated 80 is mounted for vertical movement on a guide post 82 that extends vertically between the base frame plate 40 and the top frame plate 42.

The lifter assembly includes a generally vertical bread lifter carriage plate 84 formed from sheet metal and adapted to be supported for vertical movement in the control chamber 48. The carriage plate 84 has a top margin 86, a bottom margin 88, and opposite side margins 90. A pair of angled slots 92 open to respective ones of the side margins 90 and an L-shaped tab 96 extends forwardly and upwardly from the front face of the sheet material forming the carriage plate 84, the tab being struck out of the sheet material.

The lifter assembly 80 further includes a pair of bread lifters 98 for holding food items to be toasted in the toasting chamber. Each bread lifter comprises a one-piece wire rod having a first, generally-horizontal, food-supporting section or arm 100 in which the wire rod extends along a zig-zag or tortuous path having excursions extended to both sides beyond a horizontal center axis of the path to provide an upwardly-facing, food-supporting surface 102. Each bread lifter has a second, generally-vertical, connecting section 104 extending upwardly from an end of the first section 100, the second section 104 having a lower end portion 106 extending along the rear face of the carriage plate 84, a horizontal slot section 108 extending through one of the angled slots 92, and an intermediate section 110 extending along the front face of the carriage plate 84, and an upper end portion 112 extending at approximately 90° to the intermediate section 110 and confined between the L-shaped tab 96 and the front face of the carriage plate 84. This construction enables one to easily insert the bread lifters 98, after they are previously connected to the bread carriage plate 84 as illustrated, through slots 114 in the front frame plate 44 (FIGS. 3 and 9). Note that the bread lifters 98 would uncontrollably pivot about their horizontal slots section 108 if the upper end portion 112 was not confined by the L-shaped tab 96 and the front face of the carriage plate 84. Small tabs 116 struck out from the carriage plate 84 assist in holding the bread lifters 98 in a horizontal orientation until the bread lifters 98 are inserted into the toasting chamber 50. After assembly into the toasting chamber 50, the bread lifters 98 are confined to their horizontal orientations by vertical slots 118 and 120 in the front and rear frame plates 44 and 46, respectively.

With reference to FIGS. 5, 6 and 9 through 11, the bread lifter assembly 80 further includes a bearing 130 at its right side lower corner margin adapted to be hooked by a pivotally-mounted latch plate or armature 132 that holds said lifter carriage plate 84 in its lower, toasting position during a toasting cycle. In accordance with this invention, the carriage plate 84 further has a pair of forwardly-extending support plates 134 adjacent its upper margin struck out of the sheet material that forms said lifter plate 84. The support plates 134 have upper surfaces contoured to pivotally support a lifter extension, generally designated 136 which is also made from a one-piece wire rod. The lifter extension 136 has a horizontal, transversely-extending section 138 supported by said support plates 134 for pivotal movement about the major axis of the transversely-extending section 138, and a vertical section 140 depending from the outer, side end of the transversely-extending horizontal section for engaging said latch and moving said latch out of engagement with the bearing 130 upon pivotal movement of the lifter extension 136.

The lifter extension 136 further includes a horizontal, forwardly-extending front end portion 142 adapted to receive a lifter knob 144 (FIGS. 1 and 2) for lowering the lifter assembly 80 and for disengaging the latch plate 132 from the lifter plate 84 by pivotal movement of the lifter extension 136 about the horizontal axis of its transversely-extending section 138.

In normal operation of the toaster 20, a solenoid coil 146 is energized at the end of toasting cycle and draws the latch plate or armature away from the bearing 130. This releases the bread lifter assembly 80 whereupon it moves upwardly under the bias of a lifter spring 148 (FIGS. 3 and 9). A toasting cycle can be interrupted by raising the lifter knob 144 whereupon a horizontal arm 150 at the bottom of the vertical section 140 of the lifter extension pushes the latch plate 132 away from the bearing 130 as illustrated in FIGS. 10 and 11.

Referring now to FIGS. 3, 7 and 8, normal operation of the toaster is controlled by a bimetal assembly 152 that drives a switch operating shaft 154 outwardly as the temperature within the toasting chamber increases. Switch contacts (not shown) within a switch housing 156 are caused to close when the operating shaft pushes one contact into engagement with the other. Closure of the switch causes the solenoid coil to be energized and pull the latch 132 away from the bearing 130 whereupon the bread carriage is released and moves upwardly to open the power switch assembly 58 to terminate the toasting cycle. The spacing between the switch contacts and the near end of the operating shaft when the toaster is cold determines the excursion of the switch operating shaft 154 necessary to complete closure of the switch contacts. In accordance with this invention, the end of the switch housing 156 carrying the switch contacts for the solenoid coil 146 is pivoted against the bias of a switch-housing spring 158 by a color control cam 160 made from a single piece of sheet metal that extends through a slot 162 in the front plate 44 from which it derives support.

Having thus described our invention, I claim:

1. A metal body toaster comprising:

a frame assembly including a base frame member, a top frame member, and a pair of side frame members spanning between said top frame member and said base frame member; and a body assembly comprising a tubular metal body mounted on said base frame member, a front plastic end panel mounted on said metal body and closing the front end of said metal body, and a rear plastic end panel mounted on said metal body and closing the rear end thereof, said front end panel having cooling vents in the lower portion thereof that admit ambient air into said toaster between said front end panel and said front frame member, said rear end panel having cooling vents in the lower portion thereof that admit ambient air into said toaster between said rear end panel and said rear frame member, said metal body having an opening over the toasting chamber through which bread or other food items can be placed in or removed from the toaster, and said metal body having air outlet vents opening to areas between said end panels and said frame members.

2. The toaster of claim 1 further including a front heat shield and a rear heat shield depending from said top frame member between said front and rear end panels and their respective front and rear frame members.

3. The toaster of claim 2 wherein said end panels are made from polypropylene.

* * * * *